(12) United States Patent
Nelson

(10) Patent No.: US 10,482,131 B2
(45) Date of Patent: Nov. 19, 2019

(54) COLLABORATIVE CLUSTERING FEED READER

(71) Applicant: Eustus Dwayne Nelson, Colton, CA (US)

(72) Inventor: Eustus Dwayne Nelson, Colton, CA (US)

(*) Notice: Subject to any disclaimer, the term of this patent is extended or adjusted under 35 U.S.C. 154(b) by 207 days.

(21) Appl. No.: 14/644,172

(22) Filed: Mar. 10, 2015

(65) Prior Publication Data

US 2016/0283471 A1 Sep. 29, 2016

Related U.S. Application Data

(60) Provisional application No. 61/950,385, filed on Mar. 10, 2014.

(51) Int. Cl.
*G06F 17/30* (2006.01)
*G06F 16/93* (2019.01)
*G06F 16/28* (2019.01)
*G06F 16/958* (2019.01)
*G06F 16/955* (2019.01)

(52) U.S. Cl.
CPC ............ *G06F 16/93* (2019.01); *G06F 16/287* (2019.01); *G06F 16/958* (2019.01); *G06F 16/9562* (2019.01)

(58) Field of Classification Search
CPC ......... G06F 17/30011; G06F 17/30601; G06F 17/30884; G06F 17/3089
USPC ....................................................... 707/738
See application file for complete search history.

(56) References Cited

U.S. PATENT DOCUMENTS

| | | | | |
|---|---|---|---|---|
| 6,163,784 A * | 12/2000 | Taguchi | ............... | G06T 3/40 715/255 |
| 6,493,702 B1 * | 12/2002 | Adar | ............... | G06F 17/30884 707/706 |
| 6,992,687 B1 * | 1/2006 | Baird | ............... | G06F 17/241 707/E17.013 |
| 7,031,961 B2 * | 4/2006 | Pitkow | ............... | G06F 17/30884 |
| 7,047,248 B1 * | 5/2006 | Tycast | ............... | G06F 17/211 |
| 7,519,900 B2 * | 4/2009 | Zaher | ............... | G06F 17/2229 715/230 |
| 7,594,187 B2 * | 9/2009 | Baird | ............... | G06F 17/241 715/747 |
| 7,899,829 B1 * | 3/2011 | Malla | ............... | G06F 17/30884 707/741 |
| 7,949,937 B2 * | 5/2011 | Wu | ............... | G06F 16/345 715/209 |
| 7,974,964 B2 * | 7/2011 | Cucerzan | ............... | G06F 16/30 707/706 |
| 8,112,919 B2 * | 2/2012 | Borlik | ............... | G06Q 99/00 229/67.2 |
| 8,196,061 B1 * | 6/2012 | Bhojan | ............... | G06F 3/0483 715/787 |

(Continued)

*Primary Examiner* — Sheree N Brown

(57) ABSTRACT

The present invention is a method for organizing information. The invention discloses a novel and useful way of employing text analytics or other grouping mechanisms for organizing a large volume of incoming documents in a way that a user can quickly find information that the user considers interesting. Some of the best embodiments of the invention allow older information that has not been marked as interesting to expire while grouping information that has been marked as interesting with newer and similar items.

9 Claims, 1 Drawing Sheet

(56) References Cited

U.S. PATENT DOCUMENTS

| | | | | |
|---|---|---|---|---|
| 8,266,157 | B2* | 9/2012 | Carmel | G06F 16/00 707/749 |
| 8,533,199 | B2* | 9/2013 | Malla | G06F 17/241 707/741 |
| 8,548,951 | B2* | 10/2013 | Solmer | G06F 16/93 707/661 |
| 8,806,375 | B2* | 8/2014 | Tomita | G06F 3/0482 715/764 |
| 8,954,481 | B2* | 2/2015 | Fay | G06Q 50/01 705/7.13 |
| 9,319,410 | B1* | 4/2016 | Patel | H04L 63/10 |
| 9,372,932 | B2* | 6/2016 | Freed | G06F 16/954 |
| 9,715,542 | B2* | 7/2017 | Lu | G06F 16/951 |
| 2002/0016786 | A1* | 2/2002 | Pitkow | G06F 17/30884 |
| 2004/0236774 | A1* | 11/2004 | Baird | G06F 17/241 |
| 2005/0069225 | A1* | 3/2005 | Schneider | H04N 21/234318 382/305 |
| 2005/0091027 | A1* | 4/2005 | Zaher | G06F 17/2229 703/22 |
| 2007/0130517 | A1* | 6/2007 | Wu | G06F 16/345 715/209 |
| 2007/0162524 | A1* | 7/2007 | Coe | G06F 16/9535 |
| 2007/0185858 | A1* | 8/2007 | Lu | G06F 16/951 |
| 2008/0172364 | A1* | 7/2008 | Cucerzan | G06F 16/30 |
| 2011/0078094 | A1* | 3/2011 | Borlik | G06Q 10/00 705/500 |
| 2011/0219011 | A1* | 9/2011 | Carmel | G06F 16/00 707/749 |
| 2011/0231800 | A1* | 9/2011 | Tomita | G06F 3/0482 715/835 |
| 2012/0076414 | A1* | 3/2012 | Xu | G06F 16/9038 382/176 |
| 2012/0216102 | A1* | 8/2012 | Malla | G06F 17/241 715/206 |
| 2012/0303666 | A1* | 11/2012 | Freed | G06F 16/954 707/781 |
| 2013/0170752 | A1* | 7/2013 | Ramnath Krishnan | G06F 17/30026 382/182 |
| 2013/0304772 | A1* | 11/2013 | Fay | G06Q 50/01 707/821 |
| 2013/0311862 | A1* | 11/2013 | Malla | G06F 17/241 715/206 |
| 2013/0311869 | A1* | 11/2013 | Jang | G06F 17/30884 715/234 |
| 2014/0081961 | A1* | 3/2014 | Srikrishna | G06F 17/30864 707/723 |

* cited by examiner

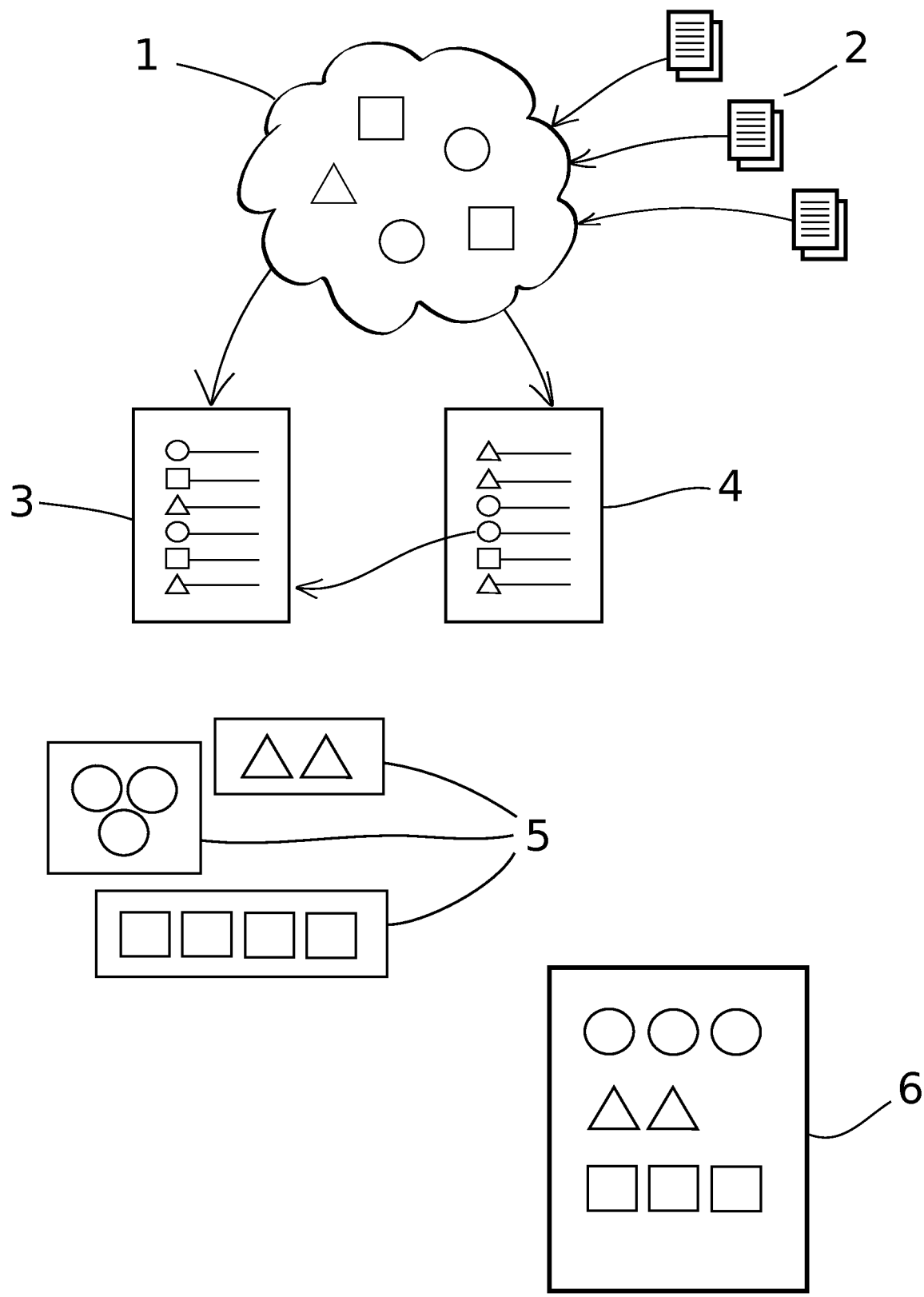

COLLABORATIVE CLUSTERING FEED READER

REFERENCES TO RELAYED APPLICATIONS

The present application claims the benefit of priority from U.S. Provisional Patent Application Ser. No. 61/950,385, entitled "Collaborative Clustering Feed Reader," filed on Mar. 10, 2014 which is hereby incorporated by reference in its entirety for all purposes.

STATEMENT REGARDING FILING CORRECTED APPLICATION PAPERS

This substitute specification contains no new matter.

TECHNICAL FIELD OF THE INVENTION

The present invention relates to a method for organizing a stream of information, in particular to a method of grouping and ordering large, frequently updating, sets of document references for browsing by human readers.

BACKGROUND OF THE INVENTION

RSS has been used for over 14 years for helping to distribute web content. By RSS, we refer to RSS, Atom and Web feeds generally. While the apparent significance of RSS has declined in some recent years, possibly in response to social media, the functionality that RSS provides has been baked into the Web and a majority of popular websites offer subscriptions via RSS.

Text analytics tools can be and have been applied to Web content, and by extension, to web feeds for over 10 years. One system of note from 2004, "Monkey News," effectively aggregated content from a number of RSS feeds, while identifying grouping "stories" into "topics" in a fully-automated way based on computer text analysis. Numerous U.S. patents, including U.S. Pat. No. 6,477,524 disclose methods for comparing stories (text) for relatedness.

The prior art has shown that a collection of documents can be clustered by using a range of methods. In one such method, spherical k-means, each document is tokenized and the tokens (words) can be stemmed to reduce dimensionality and counted. Stop words can be removed if desirable. A TF-IDF (term frequency—inverse document frequency) value can be computed for each token to deemphasize terms that appear often. The resulting vector of tokens and values can represent the document and documents can be compared to each other using cosine similarity of the representative vectors. When using k-means, an initial set of k clusters is created (represented by a centroid within the vector space of the documents) and the documents each placed into the cluster nearest to the document (via one of many known distance functions including cosine similarity) before recomputing the cluster centroids based on the mean (average) value of the vector components in the documents contained by the cluster. This process is repeated until some condition is satisfied.

A system that accommodates multiple users may be able to suggest additional documents and sources (for which a single user may not be subscribed) that also fit into the topics that are represented in a user's feed, whether or not the feed appears as a cluster. Before discontinuation in 2013, Google Reader provided related documents and related sources. However, Reader and similar systems all failed to cluster existing documents with related documents from feeds and bookmarks. In related prior-art, U.S. application Ser. No. 13/761106 discloses a method for display social media links related to items in a news feed. This efforts too is distinct from the present invention in that it provides no benefit from user bookmarks and does not explicitly target the organization skills of a variety of experts.

SUMMARY OF THE INVENTION

The current invention extends RSS clustering by using enabling social interaction to better assist users in finding interesting content.

This application discloses a method for organizing information. During the execution of the method, a stream of document references from at least one source is received for display on some sort of computer screen. The method benefits by receiving a bookmark designation for at least one document. The bookmark can be thought of as an indication that the corresponding document is interesting. At least one documents references that has not been associated with a bookmark may be deemphasized. The remaining documents are then grouped by some defined similarity and presented for display.

BRIEF DESCRIPTION OF THE DRAWINGS

FIG. 1 is a schematic diagram of the method of the present invention showing document references arriving over a network and being organized according into groups or clusters before being displayed.

DETAILED DESCRIPTION OF THE INVENTION

The present invention will be described in further detail below through specific embodiments. FIG. 1 is a schematic diagram, showing by example the method of the invention. A set of documents 1 is assembled from one or more sources 2. The documents 1 are intended for one or more users and can appear in the order received 3, 4.

Over time, document references will be added and removed to the list of references corresponding to a given user 3. By clustering a rolling collection of documents that are on a user's reading list 3, a user can always be presented 6 with document clusters 5 that make sense for the items that correspond to the user. This enables a clustering system to maintain an appropriate level of granularity for the clusters that are presented. As documents age, they can expire from the list. By keeping bookmarked (interesting) documents beyond the usual expiration time, a user's document collection 3 can eventually be skewed to contain a higher percentage of bookmarked documents than would be present if all documents expired. Depending on the mechanisms used for clusterings, this can ultimately result in more detailed differentiation of clusters 5 within these "interesting" topic areas. The user is eventually presented with the clustered output 6 ordered by some notion of similarity and containing a higher ratio of interesting items.

The operation of a preferred embodiment has two phases: document accumulation and organization. These phases have been modified from the prior art to enable collection of more documents than a simple feed subscription mechanism would enable and organization in more ways than a straight-forward application of a clustering method would enable. While the inclusion of additional documents can enhance the viewing experience by bringing more information to the user, it should be noted that augmenting the clustering mechanisms can be very beneficial as well as clusters can be used to highlight more interesting content or deemphasize less interesting content in a user interface. Clustering mechanisms are discussed first.

Because a single solution may not be effective in all circumstances, a preferred embodiment can enable multiple clustering mechanisms to be applied to a corpus of documents to organize the information in different ways with different qualities (efficiency and accuracy profiles, for example). One mechanism, for example, might be an automated measure of the use of pronouns as has been suggested by James Pennebaker. This example highlights that it is possible to cluster/classify for features other than topic. Because some clustering mechanisms may not be functions of the actual document content (perhaps depending more on source or timing), a preferred embodiment would allow extrinsic sources (such as human input) to be used to determine cluster membership.

In some topic domains, a human expert will be more effective in organizing content than even fairly sophisticated computer text analysis. In a preferred embodiment of the invention, the system will permit human-designated clusters to be defined alongside machine-defined clusters. Such a cluster can be designated in many ways including but not limited to submission of individual documents to be processed into centroids for a clustering algorithm such as k-means, or simply specifying some set of documents to be included or excluded from the cluster designation. These human-designated clusters can be made selectively available (exported or published) to other users (other users are users that were not responsible for creating the cluster) on the system so that these other users can benefit from the categorization expertise of the author of the human-designated cluster.

Because clusters represent just a way of viewing information that is already before the user, a user can choose to subscribe to as many clusters as the user chooses and these subscriptions may be prioritized to ensure that conflicts between the organization schemes are resolved in a way that the user prefers.

In a preferred embodiment, the RSS feeds themselves are supplemented by user-supplied content. User-A, subscribed to feeds One, Two and Three might receive a document from User-B for a document that does not appear in any of User-A's subscribed feeds. The system enables User-B to send the document into User-A's stream of documents 3, 4. Preferably, the system will indicate to User-A that the document has come from User-B (this indication may take the form of a "feed" corresponding to User-B) and the system may also provide an interface for User-B to add some text to be delivered to User-A along with the document. User-B can use this to explain to User-A why the document has been sent. This social ability benefits User-A because User-A is receiving information that may be relevant without necessarily having to be subscribed to the ultimate information source 2. Because the document reference 1 is being provided on the system rather than being dumped into an email inbox, User-A can look at the document (or not) at User-A's convenience. In a preferred embodiment, User-A may decide that User-A is more or less interested in receiving documents from some or all other users. The system may enable white-list, black-list or other filters to enable the flow of documents from other users to better approximate the desires of the receiving user.

In a preferred embodiment, documents can be received on the system even where there is no "feed" associated. A user, whether registered on the system or not, may submit a URL to the system for at least one user and that URL can then be made available to the feed of users who have received it. In this way, a user can maintain a list to an unrestricted set of URLs, and the documents can be clustered along with documents from any feed that the user happens to be subscribed to.

Together many of these enhancements to a feed clustering system make it easier for users to specify the information sources 2 that they care about (something that social software typically does not do) while benefiting from the wisdom of a network of associates (something that traditional feed readers do not do) and presenting the aggregate in a format more suitable to a high volume content consumption.

I claim:

1. A method for presenting documents, the method comprising:
    receiving over a computer network a stream of document references from at least one source into a collection;
    receiving at least one user bookmark for a bookmarked document;
    designating at least one deemphasized document reference from said collection, said deemphasized document reference relating to a document identified as less interesting;
    removing said at least one deemphasized document reference from said collection if said at least one deemphasized document reference is not associated with a user bookmark;
    identifying groups of document references having a defined similarity from said collection; and
    presenting said groups of document references having a defined similarity on a display, wherein said groups of document references having a defined similarity contains a reference to said bookmarked document.

2. The method of claim 1, wherein at least one source is obtained from a user subscription list.

3. The method of claim 1, wherein at least one source is an RSS feed.

4. The method of claim 1, wherein at least one document reference from a source not identified in a user subscription list is grouped with a document reference from said collection.

5. The method of claim 1, further comprising:
    receiving at least one definition of similarity operable to identify groups of document references.

6. The method of claim 1, wherein said step of identifying groups of document references having a defined similarity is executed by performing analytics on text contained within documents referenced by the document references.

7. The method of claim 1, wherein a user is notified when a new document is added to one of said groups of document references having a defined similarity.

8. The method of claim 1, wherein a document reference is deemphasized upon reaching a certain age.

9. The method of claim 1, wherein at least one older bookmark appears in a recent group of document references.

* * * * *